(12) United States Patent
Vora et al.

(10) Patent No.: US 10,805,279 B2
(45) Date of Patent: *Oct. 13, 2020

(54) COMMUNICATION MODULE FOR EMBEDDED SYSTEM

(71) Applicant: Ayla Networks, Inc., Santa Clara, CA (US)

(72) Inventors: Jigar Vora, San Mateo, CA (US); Marko Kiiskila, Sunnyvale, CA (US); Daniel Myers, Fremont, CA (US); Joseph R. Eykholt, Santa Clara, CA (US); Adrian Caceres, Los Gatos, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/153,609

(22) Filed: Oct. 5, 2018

(65) Prior Publication Data

US 2019/0044926 A1    Feb. 7, 2019

Related U.S. Application Data

(60) Continuation of application No. 15/233,754, filed on Aug. 10, 2016, now Pat. No. 10,129,226, which is a
(Continued)

(51) Int. Cl.
*G06F 15/16* (2006.01)
*H04L 29/06* (2006.01)
*H04L 9/08* (2006.01)

(52) U.S. Cl.
CPC .......... *H04L 63/0492* (2013.01); *H04L 9/085* (2013.01); *H04L 9/0891* (2013.01);
(Continued)

(58) Field of Classification Search
CPC . H04L 63/0492; H04L 63/0428; H04L 63/06; H04L 9/085; H04L 9/0891; H04L 65/1069; H04L 2209/80
(Continued)

(56) References Cited

U.S. PATENT DOCUMENTS 6,363,282 B1    3/2002  Nichols et al.
7,085,814 B1 *  8/2006  Gandhi ............... H04L 29/1232
                                                          709/208
(Continued)

FOREIGN PATENT DOCUMENTS

WO    2013/027955 A2    2/2013

*Primary Examiner* — Ario Etienne
*Assistant Examiner* — Sahera Halim
(74) *Attorney, Agent, or Firm* — Lowenstein Sandler LLP

(57) ABSTRACT

A hardware module for an embedded system comprises a network adapter, a memory and a processing device. The memory stores a shared key and a key identifier (ID) associated with the shared key. The processing device is to connect to a local area network (LAN) using the network adapter. The processing device is further to receive a first notification from a computing device that is also connected to the LAN and determine whether the computing device has access to a copy of the shared key based on the key identifier (ID). Responsive to determining that the computing device has access to the copy of the shared key, the processing device is to use the shared key to generate a session key for a session with the computing device. The processing device may then encrypt communications to the computing device using the session key.

15 Claims, 11 Drawing Sheets

Related U.S. Application Data division of application No. 13/908,971, filed on Jun. 3, 2013, now Pat. No. 9,426,185.

(52) U.S. Cl.
CPC .......... *H04L 63/0428* (2013.01); *H04L 63/06* (2013.01); *H04L 65/1069* (2013.01); *H04L 2209/80* (2013.01)

(58) Field of Classification Search
USPC ........................................ 709/237, 232, 227
See application file for complete search history.

(56) References Cited

U.S. PATENT DOCUMENTS

| | | | | |
|---|---|---|---|---|
| 7,904,527 | B2* | 3/2011 | Sarma | G06F 11/2294 |
| | | | | 709/217 |
| 8,464,061 | B2* | 6/2013 | Bradley | H04W 8/005 |
| | | | | 713/171 |
| 8,509,756 | B2 | 8/2013 | Kumar et al. | |
| 2003/0087636 | A1* | 5/2003 | Mazzara | H04W 76/10 |
| | | | | 455/426.1 |
| 2003/0149874 | A1* | 8/2003 | Balfanz | H04L 63/0492 |
| | | | | 713/168 |
| 2004/0073654 | A1 | 4/2004 | Sarma | |
| 2004/0090984 | A1* | 5/2004 | Saint-Hilaire | H04L 12/4633 |
| | | | | 370/463 |
| 2004/0199897 | A1 | 10/2004 | Ghercioiu et al. | |
| 2005/0108524 | A1* | 5/2005 | Witchey | H04L 69/08 |
| | | | | 713/165 |
| 2005/0213768 | A1 | 9/2005 | Durham et al. | |
| 2005/0262247 | A1* | 11/2005 | Whitehead | H04L 63/0442 |
| | | | | 709/227 |
| 2006/0034456 | A1 | 2/2006 | McGough | |
| 2007/0121949 | A1* | 5/2007 | Eastham | G06F 21/602 |
| | | | | 380/278 |
| 2007/0150932 | A1 | 6/2007 | Milligan et al. | |
| 2008/0116275 | A1 | 5/2008 | Clarke et al. | |
| 2008/0130639 | A1 | 6/2008 | Costa-Requena et al. | |
| 2010/0203833 | A1 | 8/2010 | Dorsey | |
| 2010/0257583 | A1 | 10/2010 | Ngo et al. | |
| 2011/0002325 | A1 | 1/2011 | Jin et al. | |
| 2011/0138196 | A1 | 6/2011 | Magnuson et al. | |
| 2011/0299685 | A1* | 12/2011 | Hall | H04L 9/0822 |
| | | | | 380/273 |
| 2012/0131416 | A1 | 5/2012 | Dugan et al. | |
| 2012/0147825 | A1 | 6/2012 | Hassan et al. | |
| 2013/0185815 | A1 | 7/2013 | Leotsarakos | |

\* cited by examiner

COMMUNICATION MODULE FOR EMBEDDED SYSTEM

RELATED APPLICATIONS

The present application is a continuation of U.S. patent application Ser. No. 15/233,754, filed Aug. 10, 2016, which is a divisional of U.S. patent application Ser. No. 13/908,971, filed Jun. 3, 2013, issued as U.S. Pat. No. 9,426,185, both of which are hereby incorporated by reference herein.

BACKGROUND

Many modern appliances, consumer devices, and other devices include embedded systems that are configured to perform one or more dedicated functions. However, most embedded systems of such devices do not include networking capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer.

Some consumer devices such as routers, network storage devices and so on provide an interface that enables these devices to be accessed over a local area network (LAN) via a remote interface. The remote interface is typically accessible using a standard web browser. Standard security practices for the remote interfaces are either non-existent or insecure. For example, one common practice is to configure the device with a permanent password and to identify that password on a sticker attached to the device. Any individual who knows the password can access the device. As a result, security leaks may occur through the manufacturing and distribution chain of the device. Additionally, once the password is compromised, security of the device is compromised for the life time of that device. Accordingly, typical security solutions for the remote interfaces of such conventional consumer devices often introduce a security hole.

BRIEF DESCRIPTION OF THE DRAWINGS

Reference will now be made to the accompanying drawings showing example embodiments of the present application, and in which.

DESCRIPTION OF EXAMPLE EMBODIMENTS

Figure 1:
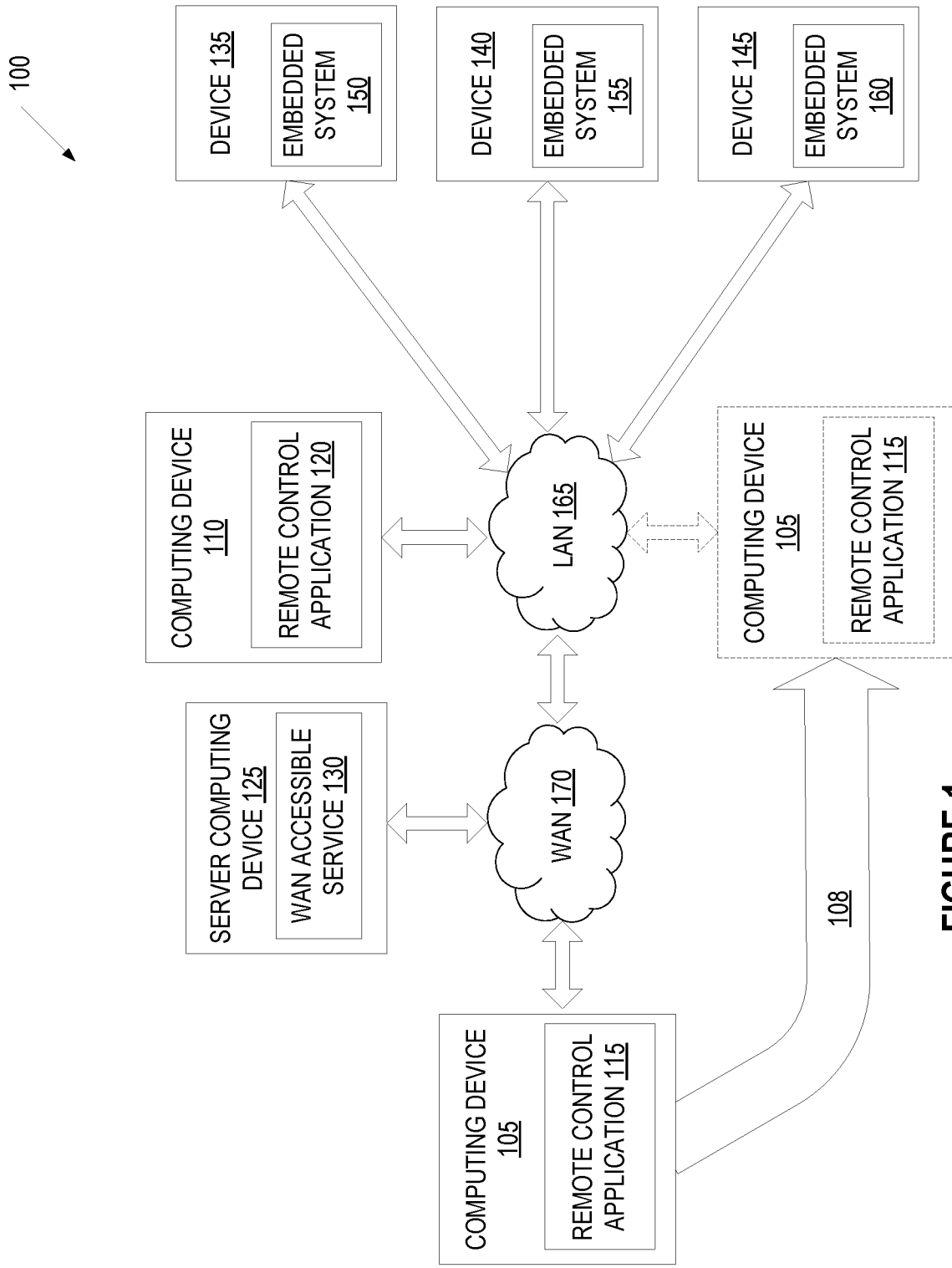
FIG. 1 is a block diagram depicting an example network architecture including remotely accessible embedded systems.

Embodiments are directed to an embedded system having a remote control interface and to a remote control application capable of communicating with the embedded system. The remote control application is capable of establishing a direct local area network (LAN) session with the embedded system and of communicating with the embedded system over the LAN session. The remote control application is additionally capable of establishing a session with a wide area network (WAN) accessible service (e.g., a web service or "cloud" service). The WAN accessible service may maintain a session with the embedded system, or may periodically establish sessions with the embedded system, and the remote control application may use the WAN accessible service as a proxy for communicating with the embedded system. The remote control application may determine whether it is on the same LAN as the embedded system, and may establish the direct LAN session with the embedded system if they are connected to the same LAN. If the remote control application and the embedded system are not on the same LAN, then the remote control application may communicate with the embedded system via the session with the WAN accessible service.

The remote control applications described in embodiments herein may automatically identify the optimal means to connect to an embedded system and may connect to that embedded system using the identified means. Additionally, the remote control application may transition from a direct LAN session with the embedded system to an indirect connection via a WAN accessible service automatically (without user input) as a computing device running the remote control application moves out of range of the LAN. Similarly, the remote control application may automatically transition from an indirect connection to the embedded system via the WAN accessible service to a direct LAN connection after the computing device hosting the remote control application joins the LAN. A direct LAN connection may provide reduced latency between receiving user commands at the remote control application and implementing those commands by the embedded system. An indirect connection via the WAN accessible service may enable control of the embedded system regardless of a user's location. Accordingly, the automatic identification of an optimal connection type and establishment of the identified connection type enhances a user experience.

In some embodiments, the remote control application and embedded system use a non-static security mechanism for establishing direct LAN sessions. The WAN accessible service may generate shared keys and distribute these shared keys to the embedded system and to remote control applications that are authorized to communicate with the embedded system. The remote control application and embedded system may use these shared keys to establish secure sessions. The keys may be revoked and/or replaced at any time. For example, if a shared key becomes compromised the WAN accessible service may revoke that shared key and deliver a new shared key to the embedded system and to the remote control application. Thus, the security implementations described in embodiments herein provide maximum security for establishing direct LAN sessions in a manner that may be transparent to a user.

Referring now to the figures, FIG. 1 is a block diagram depicting an example network architecture 100 including remotely accessible embedded systems and computing devices that interact with the embedded systems. The network architecture 100 includes multiple devices 135, 140, 145 and computing devices 105-110 connected to a local area network (LAN) 165. The devices 135-145 are devices with embedded systems 150-155, 160, and may include, for example, electrical appliances such as refrigerators, ovens, washers, driers, dishwashers, thermostats, alarms, air conditioners, televisions, radios, receivers, amplifiers, and so forth. The devices 135-145 may also include consumer devices such as digital watches, music players, game consoles, digital cameras, printers, and so forth. Other examples of devices 135-145 include stationary devices such as HVAC systems, traffic lights, factory controllers, signs, electronic billboards, sprinkler systems, and irrigation control systems, as well as medical devices. Devices 135-145 may also be any other type of device that includes an embedded system 150, 155, 160.

An embedded system 150-160 is a class of computing device that is embedded into another device 135-145 as one component of the device 135-145. The device 135-145 typically also includes other hardware, electrical and/or mechanical components that may interface with the embedded system. Embedded systems 150-160 are typically configured to handle a particular task or set of tasks, for which the embedded systems 150-160 may be optimized. Accordingly, the embedded systems 150-160 may have a minimal cost and size as compared to general computing devices.

The embedded systems 150-160 may each include a communication module (not shown) that enables the embedded system 150-160 (and thus the device 135-145) to connect to the LAN 165. The communication module may be configured to manage security, manage sessions, manage communications with external devices, and so forth. In one embodiment, the communication module is configured to communicate using WiFi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. One example of an embedded system is described in greater detail below with reference to FIG. 3.

Referring back to FIG. 1, the LAN 165 may include a router, switch, bridge or other network device (not shown) that enables communication between multiple devices (e.g., devices 135-145, computing device 110, computing device 105, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a WiFi transceiver.

Some embedded systems 150 may not support any of the communication types supported by the network device. For example, device 135 may support Zigbee, and device 140 may support Bluetooth. To enable such devices to connect to the LAN 165, the LAN 165 may include a gateway device (not shown) connected to the network device via one of the connection types supported by the network device (e.g., via Ethernet or WiFi). The gateway device may additionally support other communication protocols such as Zigbee, PLC and/or Bluetooth, and may translate between supported communication protocols. Accordingly, some devices 135-145 may connect to the LAN through the gateway device.

The LAN 165 is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to a server computing device 125. The server computing device 125 may include a physical machine and/or a virtual machine hosted by a physical machine. The physical machine may be a rackmount server, a desktop computer, or other computing device. In one embodiment, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a WAN accessible service 130, which may be a web based service and/or a cloud service (e.g., a web based service hosted in a cloud computing platform). The WAN accessible service 130 may maintain a session (e.g., via a continuous or intermittent connection) with one or more of the embedded systems 150-160. Alternatively, the WAN accessible service 130 may periodically establish sessions with the embedded systems 150-160. Via a session with an embedded system 150-160, WAN accessible service 130 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150-160 may identify values or states of some or all detectable parameters of devices 135-145 that the embedded systems are included in. Such values or states may change based direct user interaction with the devices. Such values or states may also change responsive to commands sent to the embedded systems 150-160 by the WAN accessible service 130 and/or by computing devices 105, 110. By maintaining or periodically establishing sessions with the embedded systems 150-160, the WAN accessible service 130 may maintain up-to-date information on the states of the devices 135-145.

Computing devices 105, 110 may include portable devices such as electronic book readers, portable digital assistants, mobile phones, laptop computers, portable media players, tablet computers, cameras, video cameras, netbooks, notebooks, and the like. Computing devices 105, 110 may also include traditionally stationary devices such as desktop computers, gaming consoles, digital video disc (DVD) players, media centers, and the like. Computing devices 105, 110 may connect to the WAN 170 and/or to the LAN 165. Computing devices 105, 110 may connect to the LAN 165 when they enter a proximity to the LAN 165 sufficient to exchange data with a network device associated with the LAN 165. This may include coming within a particular proximity to a wireless antenna associated with the LAN 165 and/or physically connecting to the LAN 165 via, for example, an Ethernet cable.

Computing devices 105, 110 each include a remote control application 115, 120. The remote control application 115, 120 is configured to interface with and/or control one or more of the devices 135-145 via the devices' embedded systems 150-160. In one embodiment, the computing devices 105, 110 include separate remote control applications for each of the embedded systems 150-160. Alternatively, the computing devices 105, 110 may include a single remote control application that is capable of communicating with and controlling embedded systems 150-160 for multiple different devices 135-145.

While computing devices 105, 110 are connected to WAN 170, a remote control application 115, 120 may establish a session with the WAN accessible service 130. The WAN accessible service 130 may provide an interface for indirectly controlling and monitoring the devices 135-140. If a user desires to change a state of a device, the user may issue a command via the remote control application, and that command may be sent to the WAN accessible service 130. The WAN accessible service 130 may then forward the command on to the appropriate embedded system. Additionally, when the WAN accessible service 130 received updated state information for a device from an embedded system, the WAN accessible service 130 may forward the state information on to the remote control application. This may enable users to connect to and control the devices 135-145 from anywhere they have access to the Internet.

When a computing device 105, 110 connects to the LAN 165, the remote control application 115, 120 may automatically establish a direct connection to one or more embedded systems 150-160 that are also connected to the LAN 165. While the computing device 105, 110 is connected to the LAN 165, it may maintain a session with, and control, one or more embedded systems 150-160 even in the absence of a connection to WAN 170 (e.g., if LAN 165 loses a broadband Internet connection).

For example, computing device 105 is shown as originally being connected to WAN 170, and then moving 108 to an area in which it can connect to LAN 165. Responsive to computing device 105 connecting to LAN 165, remote control application 115 may detect that embedded systems 150-160 are also connected to LAN 165. Remote control application 115 may then send notifications to the embedded systems 150-160 to initiate the establishing of direct LAN sessions to each of the embedded systems 150-160. Once a direct LAN session is established between remote control application 115 and an embedded system, remote control application may send commands directly to the embedded system and receive status updates directly from the embedded system without using the WAN accessible service 130 as an intermediary. Such direct connection provides a low latency (e.g., near instantaneous) communication between the remote control application 115 and the embedded systems 150-160. Accordingly, the embedded system may respond to and execute user commands without any user perceptible delay.

When a computing device 105, 110 becomes disconnected from the LAN 165, the computing device 105 may automatically connect to the WAN accessible service 130 via the WAN 170. For example, if the computing device is a mobile phone, then the computing device may connect to the LAN 165 using a WiFi radio. Once the computing device goes out of range of the LAN 165, the computing device may connect to WAN 170 and WAN accessible service 130 through a connection with a wireless carrier system (e.g., though a global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX) or other wireless communication protocol connection). Accordingly, the remote control application 115 may automatically select an optimal connection type for communicating with the embedded systems 150-160, and then establish an appropriate session for the determined connection type. Such connection establishment and transition between connections and sessions may be performed automatically (without user interaction) by the remote control application 115, 120, and may be transparent to the user.

Figure 2A:
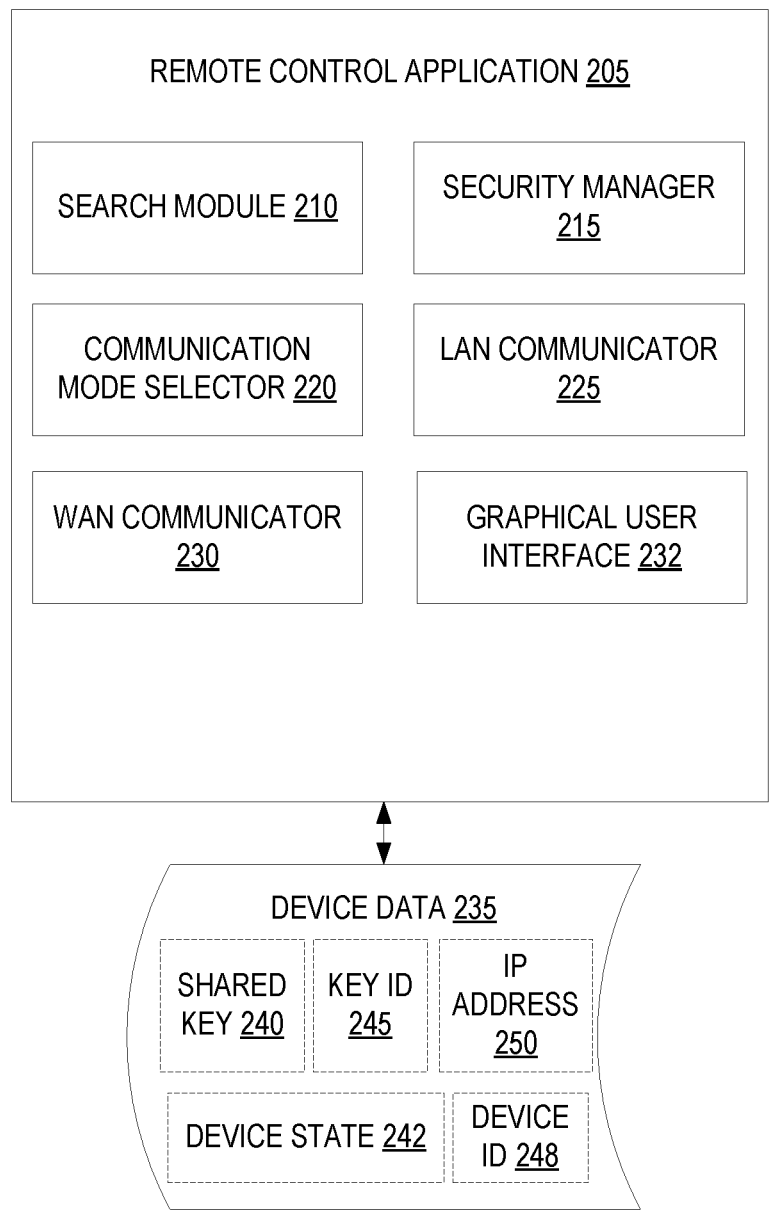
FIG. 2A is a block diagram depicting a remote control application for controlling a remotely accessible embedded system, in accordance with one embodiment of the present invention.

FIG. 2A is a block diagram of an example embodiment of a remote control application 205. The remote control application 205 may be a program or library that is executed by a processing device (e.g., by processors of computing devices 105, 110 of FIG. 1). The remote control application 205 may be programmed to run on various operating systems, such as Windows® operating systems, Unix® operating systems, iOS® operating systems, Android® operating systems and Java® operating systems to name a few. The remote control application 205 may also be configured as firmware, or as hardware, or as some combination of software, firmware and/or hardware. In one embodiment, the remote control application 205 includes a graphical user interface (GUI) 232, a search module 210, a security manager 215, a communication mode selector 220, a local area network (LAN) communicator 225, and a wide area network (WAN) communicator 230. In other embodiments, the functionality of some or all of the GUI 232, the search module 210, the security manager 215, the communication mode selector 220, the LAN communicator 225, and/or the WAN communicator 230 may be combined into a single module or divided into additional modules. The remote control application 205 may also have access to device data 235, which may include a shared key 240, a key ID associated with the shared key 245, a device ID 248 for a device that the remote control application 205 is registered with, a last known IP address 250 of the device and a last known device state 242 of the device. In one embodiment, the device ID includes a media access control (MAC) address of the embedded system. Alternatively, the device ID may be a unique identifier assigned to the embedded system (or to a communication module in the embedded system) that is separate from the MAC address. The device data 235 may be stored by a computing device that runs the remote control application 205 and/or may be stored by a remote WAN accessible service.

Graphical user interface (GUI) 232 enables users to interact with and control devices in an intuitive and user-friendly manner. GUI 232 may provide a collection of graphical icons, visual indicators, buttons, toggles, sliders, and so forth that represent states and values of different parameters for the devices as well as controls for changing those states and values. A user may interact with the GUI 232 to cause the remote control application to generate notifications, commands, property updates and other messages for the devices represented in the GUI.

Search module 210 searches for embedded systems that the remote control application 205 has been registered with. In one embodiment, search module 210 initiates a search each time the computing device executing the remote control application 205 connects to a LAN. In one embodiment, search module 210 first attempts to connect to the device using the last known IP address 250 of the device. Search module 210 may send a ping message to the IP address 250. If a response is received from the device, then search module 210 determines that the device shares a LAN connection with remote control application 205. If no response is received from the device, or a response is received from an unexpected different device, then search module may use multicast domain name system (mDNS) to locate the device. Accordingly, search module 210 may broadcast a query message asking for any device on the network having the device ID 248 to identify itself. If the device is on the LAN, then the embedded system of the device will multicast its IP address over the LAN. This then identifies the IP address of the embedded system to search module 210.

Communication mode selector 220 determines whether the remote control application 205 will communicate with the embedded system of the device directly over the LAN or indirectly using a WAN accessible service as a proxy. If search module 210 identified the device as being on the same LAN as the remote control application 205, then communication mode selector may select a direct LAN communication mode. If search module 210 determined that the device is not on the same LAN as remote control application 205, then communication mode selector 220 may select an indirect WAN communication mode. Additionally, in some instances LAN support may be disabled for the embedded system. In such an instance communication mode selector would default to WAN communication mode.

The search module 210 may detect connections to new LANs and detect disconnections from LANs as a computing device running the remote control application changes locations. Whenever a connection status to a LAN or to a WAN changes, search module 210 may perform a new search for the device. Additionally, communication mode selector 220 may select a new communication mode based on updated LAN or WAN connectivity and/or based on new search results of the search module 210.

If a WAN communication mode has been selected, WAN communicator 230 may establish a connection to a WAN accessible service. WAN communicator 230 may provide credentials of a user and/or of the remote control application to the WAN accessible service. Responsive to WAN communicator 230 providing the proper credentials, the WAN accessible service may establish a session with remote control application 205. In one embodiment, secure sockets layer (SSL) or other security protocols are used for the secure session. Once the session is established, the WAN accessible service may provide remote control application 205 with an updated IP address 250 and/or device state 242 of the device. Additionally, if a shared key 240 and key ID 245 associated with the device have changed, then WAN communicator 230 may receive and store an updated shared key 240 and key ID 245.

During a session with the WAN accessible service, a user may request to register the remote control application 205 to a new device or to de-register the remote control application from a device. The session may be associated with a particular user account, and that user account may include entries for multiple devices. For example, if a user has an oven, a dishwasher, a dryer and a washer at home, each with an embedded system, then the account may include entries for each of these devices. By registering the remote control application to a device, the remote control application 205 gains the ability to monitor and/or control that device. In one embodiment, the remote control application may be granted one of multiple different permission levels through the registration process. A first permission level may permit monitoring of a device, but not permit any control of the device. A second permission level may permit control of some (e.g., a subset of all) device functions or settings, and a third permission level may permit control of all device functions and settings, as an example.

Responsive to registering the remote control application 205 to a device, WAN communicator 230 receives one or more of the shared key 240, key ID 245, IP address 250, device ID 248 and device state 242 from the WAN accessible service. The shared key 240, key ID 245, IP address 250 and/or device ID 248 may be usable to detect the device and establish direct LAN connections and sessions to the device.

If a LAN communication mode is selected for communication with a device, LAN communicator 225 establishes a direct LAN connection and session with the embedded system of the device. To establish a session, LAN communicator 225 may invoke security manager 215.

Security manager 215 uses the shared key 240 and key ID to generate one or more unique session keys for a new session with the embedded system. The security manager 215 may determine based on the key ID that remote control application 205 and the embedded system each have a copy of the same shared key 240. For example, LAN communicator 225 may send the key ID 245 to the embedded system and/or may receive a message from the embedded system that includes a key ID. Security manager 215 may compare a key ID of a shared key used by the embedded system to the stored key ID 245 associated with the device. If the key ID's match, then security manager 215 may generate one or more session keys using the shared key.

The session keys may be established, for example, by concatenating random strings generated by the security manager and the embedded system, and hashing the concatenated strings using the shared secret. In one embodiment, session key establishment is performed in accordance with RFC 5246, section 5. In one embodiment, a first session key is generated for signing messages and a second session key is generated for encrypting messages. Additionally, a third session key may be generated for use as an initialization vector when using a block cipher in a mode of operation.

Once session keys for a secure session are established, LAN communicator 225 may use the session keys to encrypt and/or sign messages (e.g., property updates) sent to the embedded system. For example, LAN communicator 225 may use a first session key for encrypting messages and a second session key for signing messages. LAN communicator 225 may also use a session key to decrypt messages received from the embedded system and/or verify an identity of the embedded system based on digital signatures included in the messages.

Encryption may be performed using a block cipher in a feedback mode of operation (e.g., using an advanced encryption standard (AES) 256 block cipher in a cipher block chaining (CBC) mode of operation). A third session key may be used as an initialization vector for the mode of operation, and a first key may be used as in input key for the block cipher. Messages may also be encrypted with an incrementing sequence number in one embodiment to provide enhanced security.

In one embodiment, messages generated by WAN communicator and LAN communicator 225 include Javascript® object notation (JSON) objects. The JSON objects may include an encrypted payload and a signature, where the signature may have been generated using the second session key.

Notably, remote control application 205 stores the shared key 240 and key ID 245 received from the WAN accessible service. Accordingly, LAN communicator 225 may use the shared key 240 and key ID 245 to establish secure sessions with the embedded system whether or not remote control application is connected to the WAN accessible service. Additionally, the shared key 240 may be revoked and replaced at any time by the WAN accessible service and/or may expire based on an assigned expiry. Accordingly, a LAN connection may be provided that has maximum security, without the disadvantages associated with traditional LAN connection solutions.

Figure 2B:
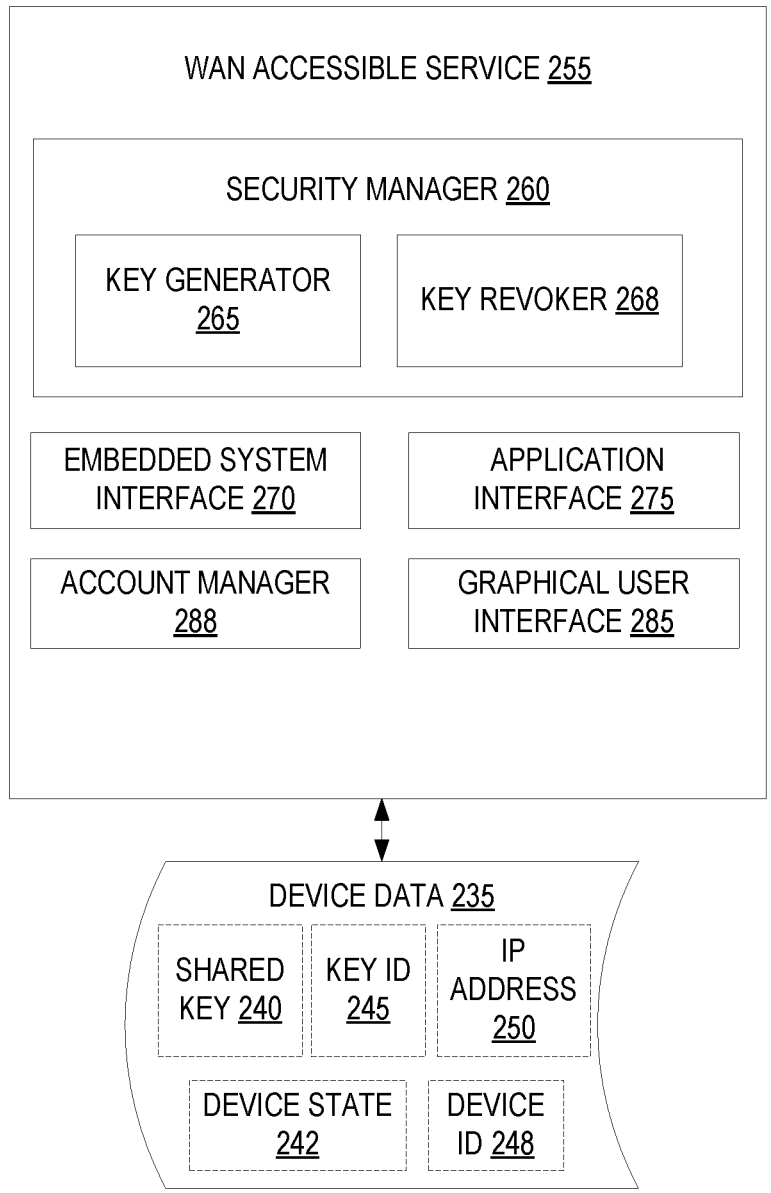
FIG. 2B is a block diagram of an example embodiment of a wide area network (WAN) accessible service.

FIG. 2B is a block diagram of an example embodiment of a WAN accessible service 255, which in one embodiment corresponds to WAN accessible service 130 of FIG. 1. WAN accessible service 255 may include a security manager 260, an embedded system interface 270, an application interface 275, a graphical user interface 285 and an account manager 288. Alternatively, the functionality of one or more of the security manager 260, embedded system interface 270, application interface 275, graphical user interface 285 and account manager 288 may be combined into a single module or divided into multiple sub-modules.

Account manager 288 manages user accounts. Each user account may include one or multiple embedded systems, one or more authorized users of the account and one or more registered computing devices allowed to communicate with the embedded systems.

Embedded system interface 270 is responsible for connecting to embedded systems. WAN accessible service 255 may establish secure sessions with and/or maintain secure sessions with one or many embedded systems identified in the user accounts. In one embodiment, WAN accessible service 255 establishes sessions with many embedded systems associated with many different user accounts. SSL or other secure communication protocols may be used to establish the secure sessions. Alternatively, WAN accessible service 255 may establish connections with embedded systems associated with a single user account. Via the active sessions, embedded system interface 270 may send notifications, property updates and/or control messages to the embedded systems and receive acknowledgments, status updates (e.g., of a device state 242 and/or local IP address 250) and other information (e.g., a device ID 248) from the embedded systems. Additionally, embedded system interface 270 may deliver shared keys 240 and associated key IDs 245 to the embedded systems, notify the embedded systems of revoked keys, and so on.

Application interface 275 is responsible for connecting to remote control applications. Application interface 275 may enable users to log in to user accounts on WAN accessible service 255 by providing the proper credentials. A secure session may be established with the remote control applications as a part of the log in process. Once a secure session is established (e.g., via SSL) and a remote control application is logged into a particular user account, application interface 275 may provide the remote control application with updated status information for embedded systems to which the remote control application is registered. Additionally, application interface 275 may receive commands from the remote control application for modifying a state of (or otherwise controlling) one or more embedded systems with which the remote control application is registered.

Graphical user interface 285 may be a web interface that is accessible from computing devices using a web browser. Accordingly, computing devices that do not include a remote control application may still log into a user account for monitoring and/or controlling embedded systems via the graphical user interface 285.

Security manager 260 manages shared keys (also referred to as shared secrets) for embedded systems. Security manager may include a key generator 265 and a key revoker 268. Key generator 265 may use a random number generator, pseudorandom number generator or other key generation mechanism to generate shared keys. A shared key 240 may be a random integer or string of values. In one embodiment, shared keys are 32 character keys (e.g., having 32 alphanumeric characters). In one embodiment, shared keys are 256 bit keys. Alternatively, other size keys may be used, such as 128 bit keys, 512 bit keys, and so on. Key generator 265 may additionally generate a key identifier (ID) 245 for each generated shared key 240. The key ID may be a random string, a sequentially incremented integer, or other data type.

Once a new shared key has been generated, embedded system interface 270 may propagate the shared key and associated key ID to the appropriate embedded system, and application interface 275 may propagate the new shared key and associated key ID to remote control applications registered to that embedded system in a user account. In one embodiment, embedded system interface 270 transmits the shared key and associated key ID to the embedded system before the shared key and key ID are distributed to any remote control applications. Embedded system interface 270 may wait for a confirmation that the embedded system received the shared key and associated key ID. Responsive to the confirmation, application interface 275 may then transmit the shared key and key ID to the remote control applications registered to the embedded system.

At any time a key may become compromised. Accordingly, key revoker 268 may revoke a key, causing the key to no longer be usable. Application interface 275 notifies remote control applications of the revoked status of a shared key and embedded system interface notifies an appropriate embedded system using that shared key of the key's revoked status. Additionally, keys may be created with a predetermined expiration. The expiration may be dictated by the embedded system for which the key is generated. Example expiration periods include 15 minutes after creation, 30 days, 6 months, and so forth.

Figure 3:
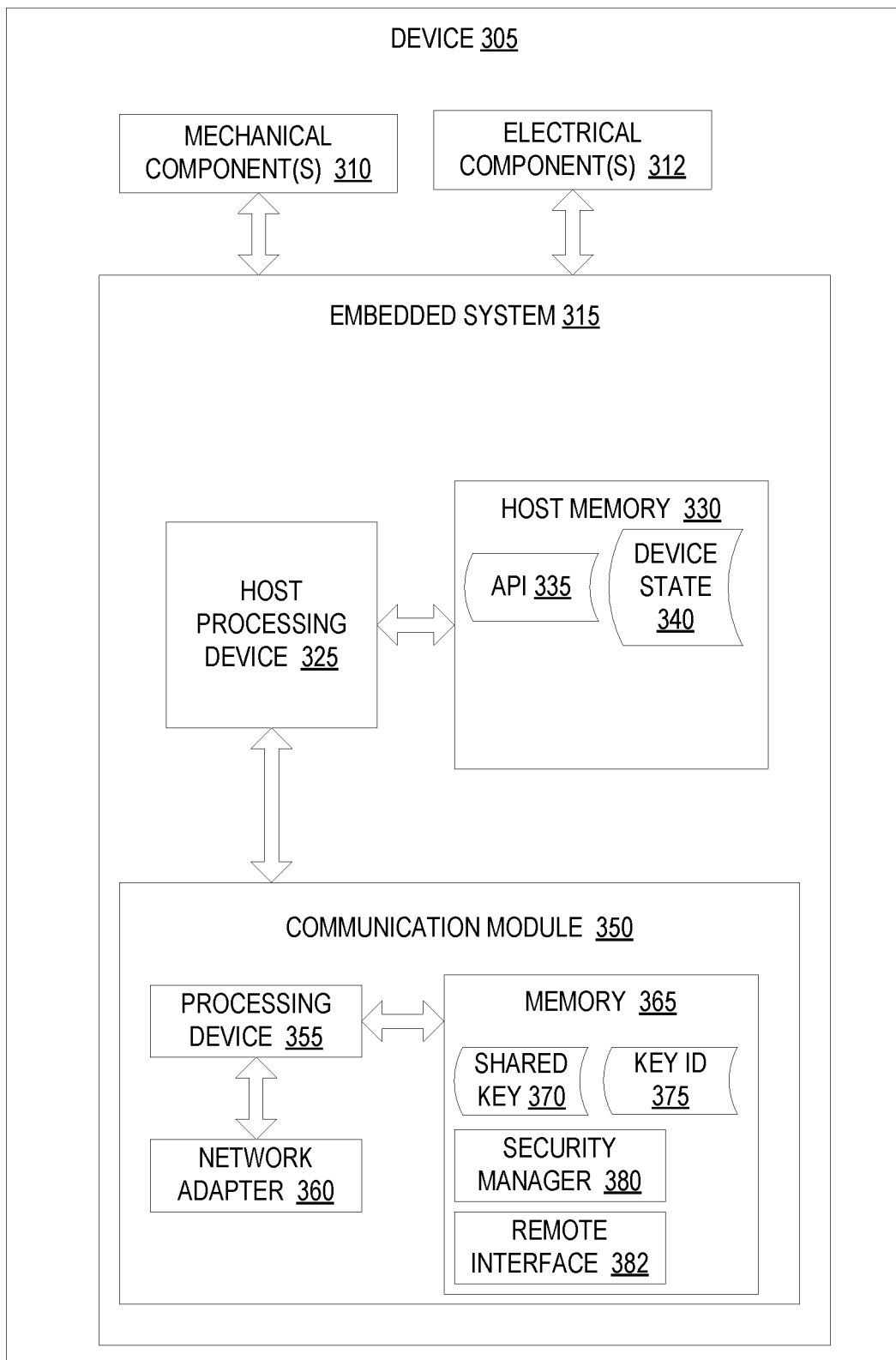
FIG. 3 is a block diagram of an example device having a remotely accessible embedded system.

FIG. 3 is a block diagram of an example device 305 having a remotely accessible embedded system 315. The device may include any of the aforementioned types of devices having an embedded system, and in one embodiment corresponds to a device 135, 140, 145 of FIG. 1. In one embodiment, the device 305 includes mechanical components 310, electrical components 312 and an embedded system 315. The electrical components 312 and/or mechanical components 310 may include sensors, programmable logic controllers (PLCs), switches, motors, valves, actuators, and so forth.

The embedded system 315 may include a host processing device 325, a host memory 330 and/or a communication module 350 coupled to the host processing device 325. The embedded system 315 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 325 may be a microcontroller or a digital signal processor (DSP) in one embodiment. Host processing device 325 may alternatively or additionally include a programmable logic controller (PLC), a field programmable gate array (FPGA) or a complex programmable logic device (CPLD). The host processing device 325 may be configured to perform specific functions related to the operation and control of the device 305.

Host memory 330 may include random access memory (RAM), read only memory (ROM), one time programmable (OTP) ROM, Flash (e.g., NOR Flash), or other types of memory. Host memory 330 may store an application programming interface (API) 335 for the communication module 350. The API 335 may enable the host processing device 325 to send commands and/or data to and receive commands and/or data from communication module 350.

Host memory 330 may additionally include a device state 340 for the device 305. The device state 340 may include a present device state, historical device state, and/or changes made to the device state over a particular period. For example, device state 340 in one embodiment includes changes made to the device's state since a connection to a WAN accessible service was lost. Host memory 330 may also include firmware for the host processing device 325 that configures the host processing device to perform one or more operations that are specific to device 305.

In some embodiments, the host memory 330 may be integrated into the host processing device 325. For example, microcontrollers typically include a processor core, memory and programmable input/output peripherals. Accordingly, if the host processing device 325 is a microcontroller, then host memory 330 may be a memory of host processing device 325.

Communication module 350 may be an integrated circuit (IC) that is configured to be coupled to host processing device 325 of embedded system 315. Communication module 350 may be provided by a third party to a manufacturer of the device along with the API 335, and may enable network capability and remote control capability to be easily added to the device 305. The communication module 350 may include its own processing device 355, a memory 365 and/or a network adapter 360. The processing device 355 may be a microcontroller, a DSP, a PLC, a microprocessor or programmable logic device such as an FPGA or a CPLD. The memory may include a non-volatile memory (e.g., RAM) and/or a volatile memory (e.g., ROM, Flash, etc.). In one embodiment, memory 365 is integrated into processing device 355.

Memory 365 may store a shared key 370 (or multiple shared keys) and an associated key ID 375 (or multiple key IDs). Memory 365 may also store firmware for the processing device 355, such as firmware that includes instructions for a security manager 380 and a remote interface 382.

Network adapter 355 may be a wired network adapter (e.g., an Ethernet adapter) or a wireless network adapter (e.g., a WiFi adapter or other wireless local area network (WLAN) adapter). Network adapter 360 may also be configured to provide connection to a network or other devices using Zigbee, PLC, Bluetooth, 6LowPAN, or other communication protocols. Network adapter 360 may receive notifications and other messages from a WAN accessible service and/or remote control applications. Network adapter 360 may additional send outgoing messages to the WAN accessible service and/or to remote control applications.

Remote interface 382 may be executed by processing device 355 to operate on messages and notifications received from a WAN accessible service and/or remote control applications. Responsive to receiving a notification from a remote control application that does not have an active LAN session with the embedded system 315, remote interface 382 may determine whether LAN support is enabled. If LAN support is enabled, remote interface 382 may send an acknowledgment response to the remote control application. If LAN support is not enabled, then the remote control operation would have to communicate with the communication module 305 of the embedded system 315 through a WAN accessible service.

Remote interface 382 may also determine if there are sufficient resources to establish a session with the remote control application. For example, remote interface 382 may include sufficient resources to maintain LAN sessions with a particular number of remote control applications in one embodiment. In such an instance, remote interface 382 would determine whether the particular number of remote control applications already have sessions with the embedded system. If so, remote interface would not establish a connection with the new remote control application from which the notification was received. If there were fewer than the particular number of remote control applications with LAN sessions, then remote interface 382 would initiate session establishment.

For session establishment, remote interface 382 may invoke security manager 380 (e.g., cause processing device 355 to execute security manager 380). Security manager 380 uses shared key 370 to generate session keys for a new session with the remote control interface. In one embodiment, remote interface 382 notifies the remote control application of the key ID 375 for the shared key 370 prior to or as a step in session establishment. If the remote control application does not have a copy of the shared key associated with the key ID, then no session may be established with the remote control application.

If the remote control application and communication module 350 include copies of the same shared key 370, then security manager 380 generates unique session keys for a new session using the shared key 370. The remote control application also generates the same unique session keys using a copy of the shared key 370. After the secure session is established, remote interface 382 may use the session keys to encrypt and sign messages to be sent to the remote control application and to decrypt and verify messages received from the remote control application.

After a session has been established, remote interface 382 may receive notifications from the remote control application and from any other remote control applications that also have active sessions. Additionally, remote interface 382 may receive notifications from the WAN accessible service. Each of the notifications may indicate that a sender of the notification has a message (e.g., a command or property update) for the embedded system 315. Remote interface 382 may or may not send acknowledgements of receipt of the notifications to senders. Additionally, remote interface 382 may place the notifications into a queue based on an order that they were received, and may process the notifications on a first in first out (FIFO) basis.

When a notification is to be processed, remote interface 382 sends a message to the sender of the notification requesting a message. The remote interface 382 then receives the requested message, decrypts it, and forwards any commands or property updates from the message on to host processing device 325. Host processing device 325 may perform one or more operations based on the commands, which may cause a state of one or more parameters or properties for the device 305 to change. The host processing device 325 may report the changed device state to processing device 355.

Remote interface 382 may generate a status update message, and may send it to the connected remote control applications and to the WAN accessible service if an auto echo mode is enabled. If an auto echo mode is disabled, then the host processing device may determine which, if any, remote control applications and/or WAN accessible services will be notified of the state update, as well as when such updates will be distributed. For example, the host processing device 325 may determine to actively update LAN sessions for every state change and only update the WAN accessible service with latest information once a day. The WAN accessible service may then forward the status update to any remote control applications that are not directly connected to embedded system 315 over the LAN.

Processing device 355 may keep track of every remote control application and WAN accessible service it has an active session with. Reachability to the WAN accessible service may be detected in numerous ways. For example, remote interface 382 may attempt to POST to the WAN accessible service with status updates and/or may attempt to ping the WAN accessible service. If a POST attempt and/or ping attempt fails after one or more retries, processing device 355 may inform host processing device 325 that the WAN accessible service is unreachable. Remote interface 382 may then periodically attempt to reconnect to the WAN accessible service (e.g., every 5 minutes, every 10 minutes, or at some other interval).

In one embodiment, processing device 355 notifies host processing device 325 each time communication module 350 connects to or loses connection with a destination (e.g., with WAN accessible service or a remote control application). The host processing device 325 may use this information to keep track of WAN accessible service reachability and record which property updates/state changes have not been reported to the WAN accessible service in device state 340. Once a connection to the WAN accessible service is reestablished, host processing device 325 or processing device 355 may send all updates that the WAN accessible service missed.

Though memory 365 is shown to have a single shared key 370 and associated key ID 375, it should be understood that memory 365 may alternatively include multiple different shared keys and key IDs. In one embodiment, memory 365 includes different shared keys associated with different permission levels. A remote control application may be granted a level of access and control of the embedded system 315 based on the permission level associated with a shared key in possession of that remote control application. Additionally, memory 365 may store multiple shared keys having different expirations and/or different valid use periods. For example, a first shared key may be usable for a first month and then expire, and a second shared key may become usable for a second month after the first shared key expires.

Figure 4:
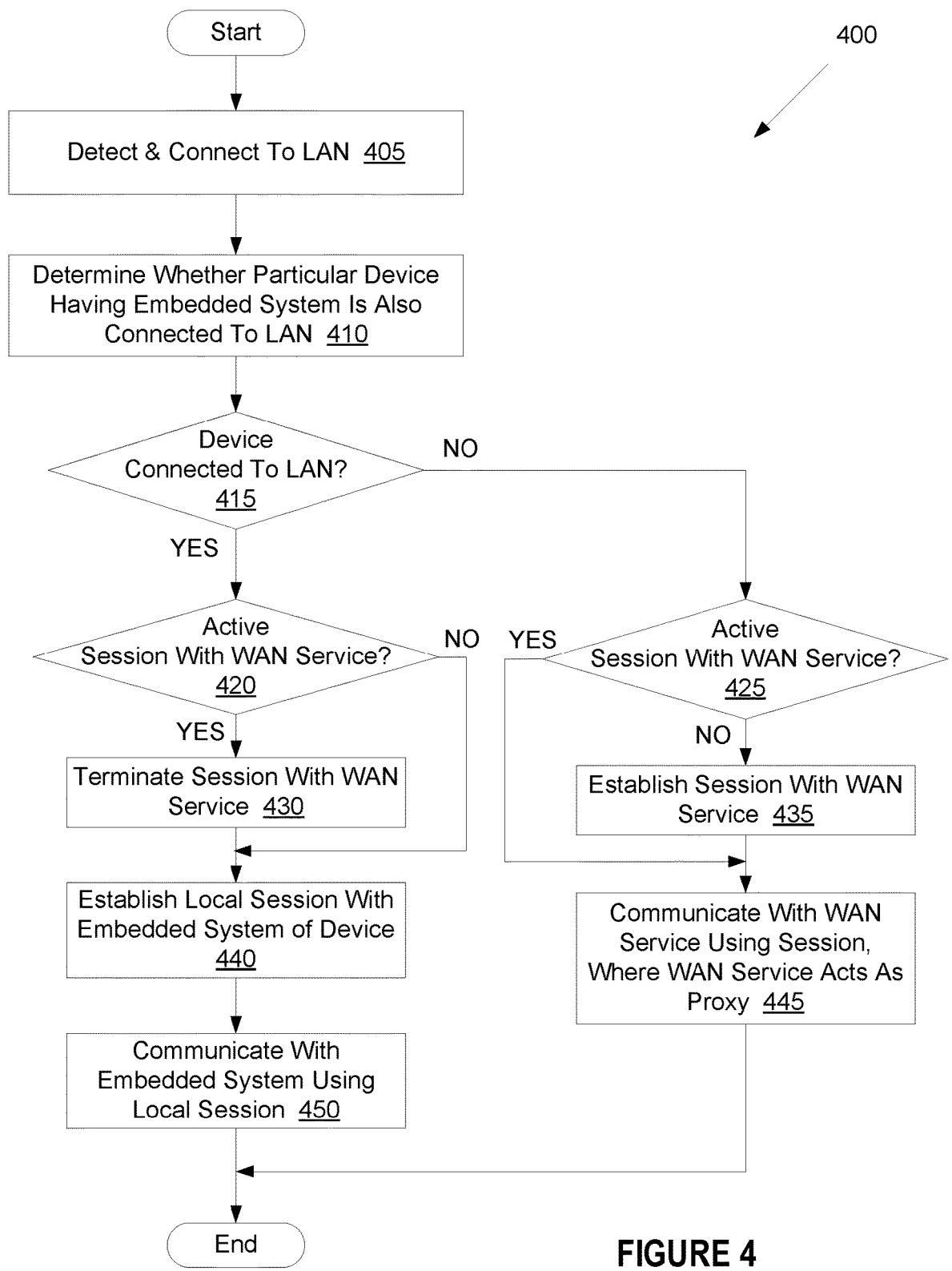
FIG. 4 is a flow chart of an example method of communicating with an embedded system.
Figure 5:
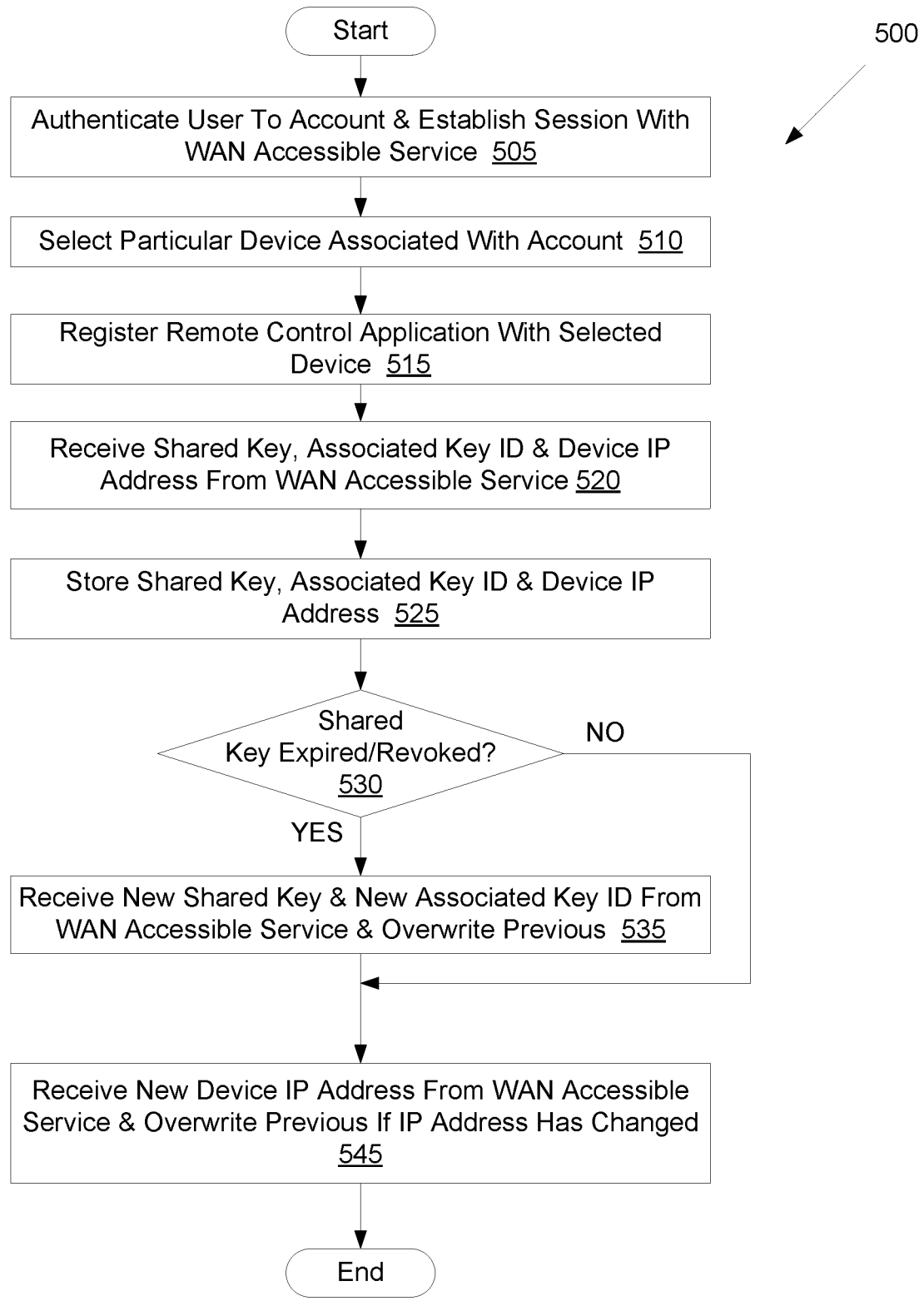
FIG. 5 is a flow chart of an example method of registering a computing device with an embedded system via a WAN accessible service.
Figure 6:
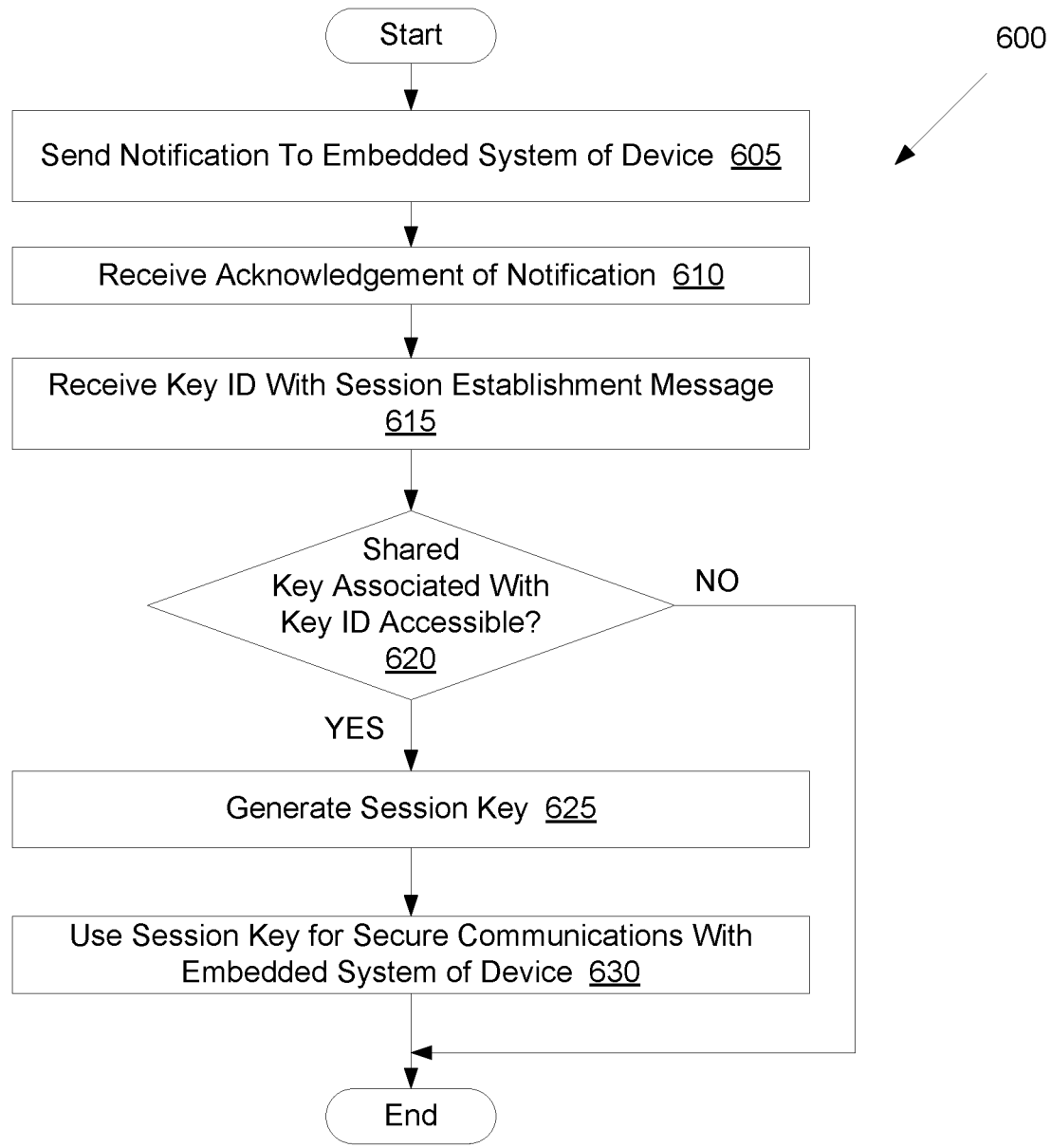
FIG. 6 is a flow chart of an example method of establishing a connection with an embedded system over a local area network.

FIGS. 4-6 are flow diagrams showing various methods of establishing a LAN session with an embedded system and of communicating with the embedded system. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a remote control application, such as remote control application 205 of FIG. 2.

FIG. 4 is a flow chart of an example method 400 of communicating with an embedded system. At block 405 of method 400, processing logic detects a LAN and connects to the detected LAN. At block 410, processing logic determines whether a particular device having an embedded system is also connected to the LAN. In one embodiment, processing logic sends a ping to a last known IP address of the embedded system on the LAN. If no response is received, or if a response is received from a device other than the embedded system, processing logic may use mDNS to find the embedded system on the LAN.

At block 415, processing logic determines whether the particular device with the embedded system is on the LAN. If the device is on the LAN, the method proceeds to block 420. If the device is not on the LAN, the method proceeds to block 425.

At block 420, processing logic determines whether there is already an active session with a WAN accessible service (also referred to as a WAN service). If so, the method may proceed to block 430, and processing logic may terminate that active session. Alternatively, processing logic may maintain the active session with the WAN accessible service. This may enable processing logic to later transition to use of the session with the WAN accessible service without going through the session establishment routine if a connection to the LAN is lost. If there is not a current session with the WAN accessible service, the method proceeds to block 440.

At block 440, processing logic establishes a local session with the embedded system of the device over the LAN. This may be referred to as a LAN session. One embodiment of session establishment is set forth below with reference to FIG. 6. At block 450, processing logic communicates with the embedded system using the local LAN session. In one embodiment, the session with the embedded system has a limited lifetime for which it is valid. Accordingly, processing logic may periodically refresh the session to extend its lifetime.

At block 425, processing logic determines whether there is an active session with the WAN accessible service. If there is such an active session, the method proceeds to block 445. Otherwise, at block 435 processing logic establishes such a session with the WAN accessible service (e.g., by using a secure web protocol such as SSL) and logging into a user account on the WAN accessible service). At block 445, processing logic communicates with the WAN accessible service using the session. The WAN accessible service may act as a proxy for communications with the embedded system. For example, processing logic may send commands for the embedded system to the WAN accessible service, and the WAN accessible service may forward those commands to the embedded system. Additionally, the WAN accessible service may receive status updates and other information from the embedded system, and may forward such status updates and other information on to the processing logic.

FIG. 5 is a flow chart of an example method 500 of registering a computing device with an embedded system via a wide area network accessible service. At block 505 of method 500, processing logic authenticates a user to a user account on a WAN accessible service. Processing logic additionally establishes a secure session with the WAN accessible service (e.g., using secure sockets layer (SSL)). At block 510, processing logic selects a particular device associated with the user account. At block 515, processing logic registers a remote control application with the selected device.

At block 520, processing logic receives a shared key, an associated key ID and a last known IP address of the device from the WAN accessible service. The shared key may be a shared key currently in use by the device. Processing logic may also receive a MAC address and/or device ID of the embedded system (e.g., of a communication module in the embedded system). Processing logic may also receive an indication as to whether the embedded system has LAN support enabled. At block 525, processing logic stores the shared key, associated key ID, device IP address and/or other received information.

At block 530, processing logic determines whether the shared key has been revoked. In one embodiment, the WAN accessible service notifies processing logic when the key is revoked. Alternatively, processing logic may determine that the shared key has been revoked when processing logic fails to successfully connect to the device using the shared key. If the shared key is revoked, at block 535 processing logic may receive a new shared key and new associated key ID from the WAN accessible service. The new shared key and key ID may overwrite the original shared key and key ID in one embodiment. If the shared key has not been revoked, the method proceeds to block 545.

At block 545, processing logic receives a new IP address of the device from the WAN accessible service if the IP address has changed. Any of the operations of blocks 510-545 may be performed, and in various orders, while processing logic maintains the secure session with the WAN accessible service.

FIG. 6 is a flow chart of an example method 600 of establishing a connection with an embedded system over a local area network. At block 605 of method 600 processing logic sends a notification to an embedded system of a device that processing logic is attempting to connect to. At block 610, processing logic receives an acknowledgment of the notification.

After some time interval, processing logic receives an indication that the embedded system is ready to establish a session. This indication may be a session establishment message, which may include the key ID. At block 620, processing logic determines whether it has access to the same shared key used by the embedded system based on the key ID. If the embedded system and processing logic have access to the same shared key, the method continues to block 625. Otherwise, no session can be established, and the method ends.

At block 625, processing logic generates one or more session keys using the shared key and creates a new local session. At block 630, processing logic uses the session keys for secure communication with the embedded system of the device. This may include encrypting and signing messages sent to the embedded system using the session keys, as well as decrypting and verifying messages received from the embedded system using the session keys.

In alternative embodiments, secure sessions may be established using other techniques. For example, the embedded system may include an SSL certificate, which a remote control application may verify in order to establish an SSL session between the embedded system and the remote control application. In another alternative embodiment, the embedded system (e.g., the communication module in the embedded system) may be preconfigured with one or more security keys that are usable for session establishment.

Figure 7:
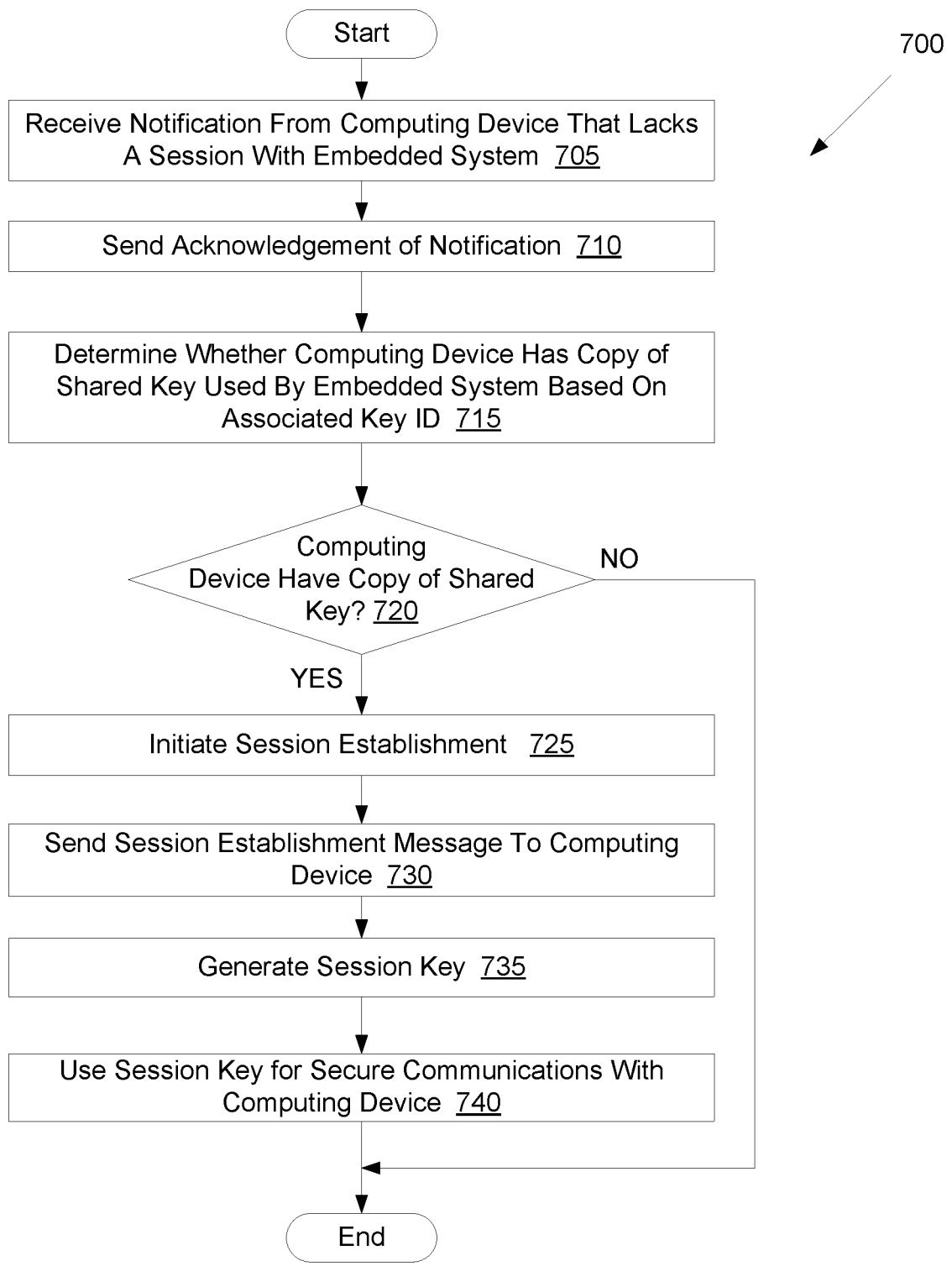
FIG. 7 is a flow chart of an example method of establishing a connection with a computing device by an embedded system.
Figure 8:
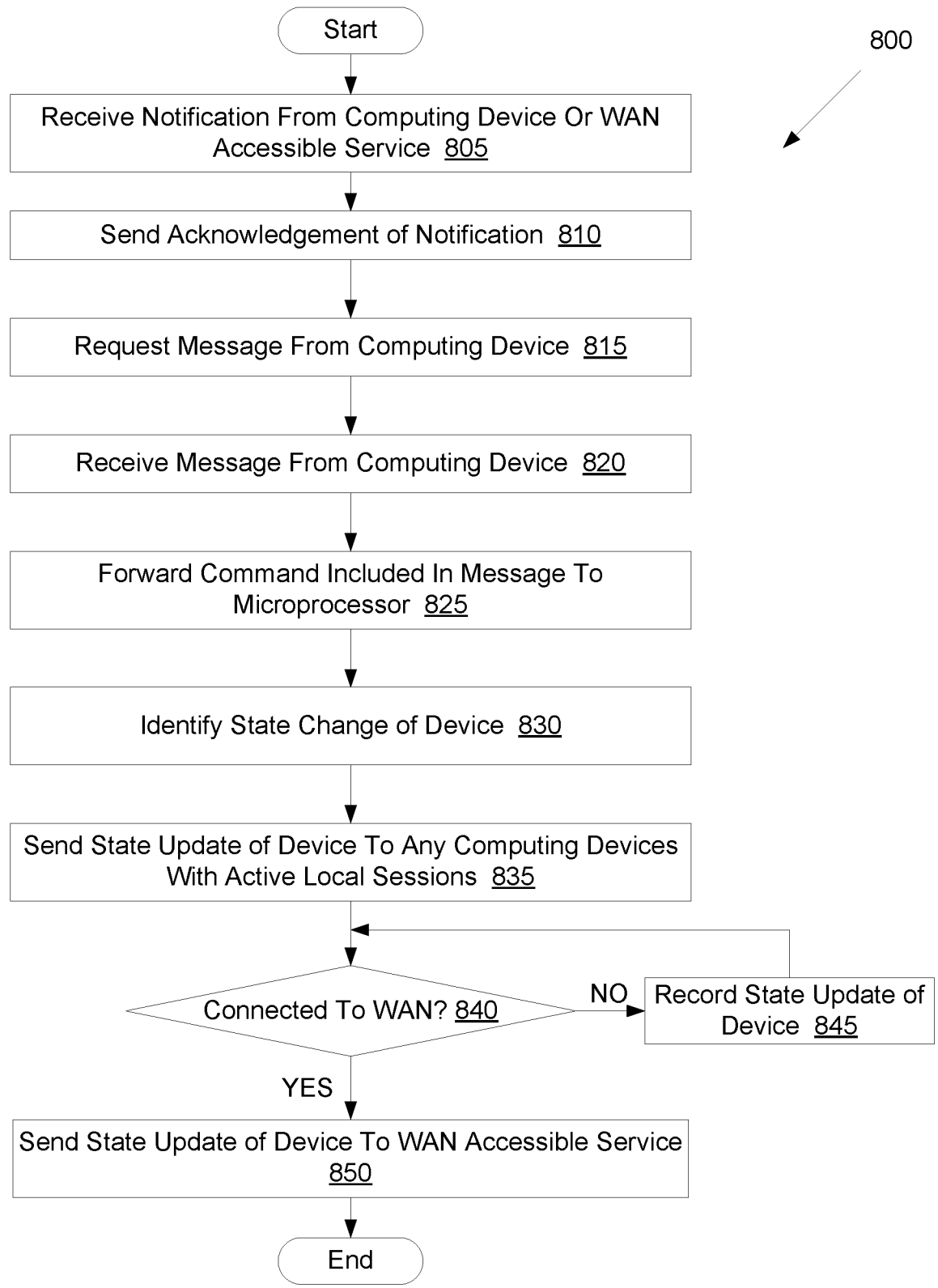
FIG. 8 is a flow chart of an example method of communicating with a computing device and WAN accessible service by an embedded system.

FIGS. 7-8 are flow diagrams showing various methods of operations performed by a communication module in an embedded system, where the embedded system is a component of a larger device. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by communication module 350 of FIG. 3.

FIG. 7 is a flow chart of an example method 700 of establishing a connection with a computing device by an embedded system. At block 705 of method 700 processing logic receives a notification from a computing device that lacks a session with the embedded system. The notification may be received from a remote control application running on the computing device. At block 710, processing logic sends an acknowledgment of the notification to the computing device if LAN support is enabled.

At block 715, processing logic determines whether the computing device has a copy of a shared key used by the embedded system. In one embodiment, processing logic sends a key ID associated with a particular shared key to the computing device, and the computing device makes the comparison. Alternatively, processing logic may receive a key ID from the computing device and compare the received key ID to a key ID associated with a shared key used by the embedded system. At block 720, if the computing device and embedded system have the same shared key, the method continues to block 725. Otherwise, the method ends.

At block 725, processing logic initiates session establishment with the computing device. In an alternative embodiment, processing logic may begin session establishment without first checking for a common shared key. In such an embodiment the session establishment would later fail if these is no common shared key. At block 730, processing logic sends a session establishment message to the computing device. At block 735, processing logic generates one or more session keys based on the shared key. The computing device may also independently generate the same session keys. At block 740, processing logic uses the session key for secure communications with the computing device.

FIG. 8 is a flow chart of an example method 800 of communicating with a computing device and WAN accessible service by an embedded system. At block 805 of method 800, processing logic receives a notification from a computing device or a WAN accessible service. The embedded system may have secure sessions active with both the computing device and the WAN accessible service. At block 810, processing logic sends an acknowledgment of the notification to the sender.

At block 815, processing logic requests a message from the computing device (or from the WAN accessible service if the notification was received from the WAN accessible service). At block 820, processing logic receives a message from the computing device. The message may be encrypted, and processing logic may decrypt the message using an appropriate session key.

At block 825, processing logic forwards a command included in the message to a microprocessor (or other host processing device). The microprocessor may execute the command, which may cause a state of the device to change. At block 830, processing logic identifies a state change of the device. In one embodiment, the microcontroller sends a status update to processing logic. At block 835, processing logic sends a state update of the device to any computing device with active local connections. This may include sending the status update to a computing device that issued a message causing the state to change as well as other computing devices.

At block 840, processing logic determines whether the embedded system is connected to a WAN (e.g., to the Internet). If the embedded system is not connected to the WAN, processing logic may record the state update of the device. In one embodiment, processing logic instructs the microcontroller to store the state update. The method may then return to block 840, and processing logic may again determine whether the embedded system has a WAN connection. This process may repeat indefinitely until a WAN connection is established. Once a WAN connection is established, the method proceeds from block 840 to block 850. At block 850, processing logic sends the state update of the device to the WAN accessible service.

Figure 9:
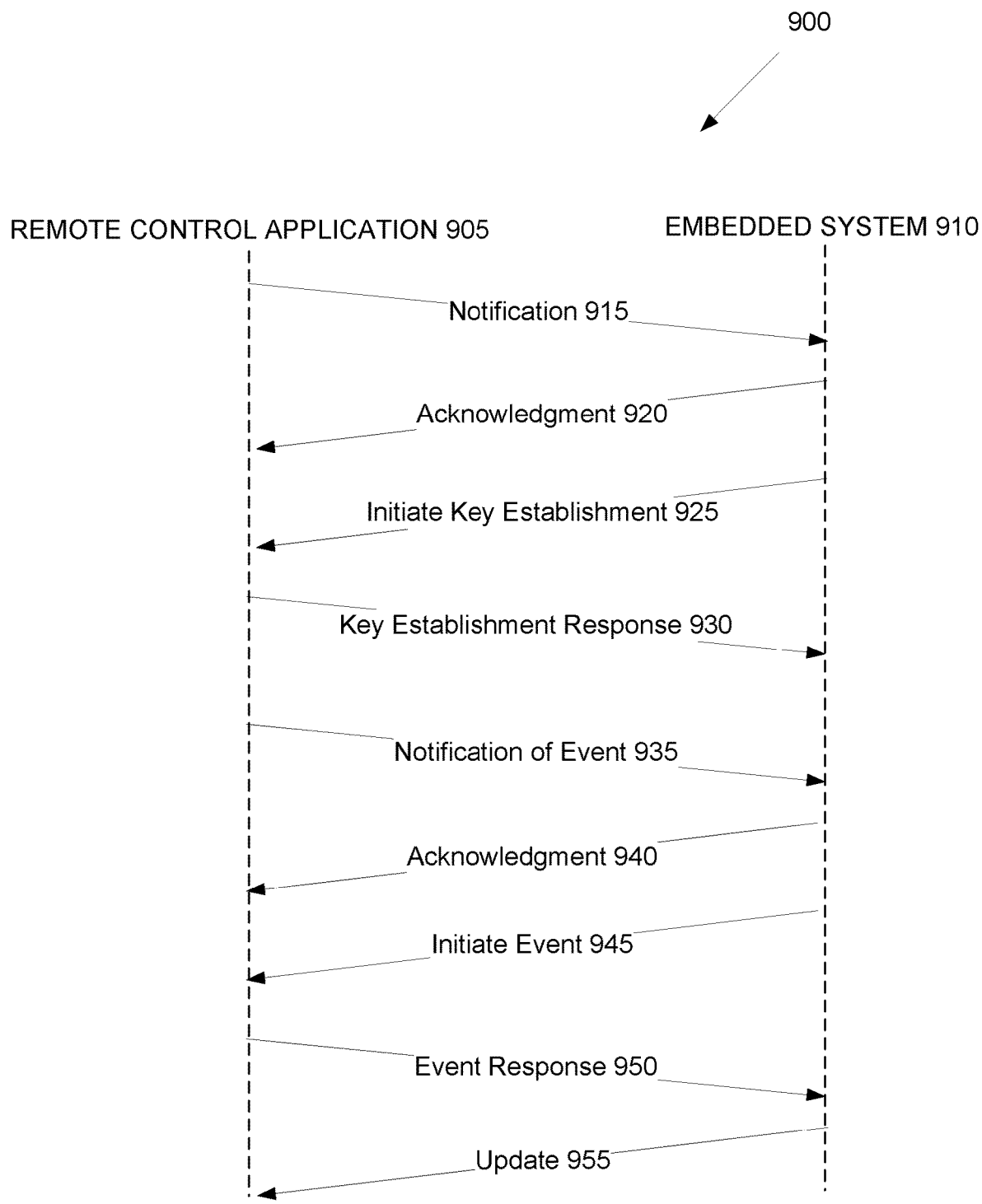
FIG. 9 is a timing diagram of session establishment and remote command operations in accordance with an embodiment of the present invention.

FIG. 9 is a timing diagram 900 of session establishment and remote command operations between a remote control application 905 and an embedded system 910 in accordance with an embodiment of the present invention. The timing diagram 900 shows that the embedded system 910 is the ultimate arbiter for both session establishment and device control.

Initially the remote control application 905 may not have a session with the embedded system 910, and may send a notification 915 indicating that the remote control application 905 would like to establish such a session. The embedded system 910 may then respond to the notification with an acknowledgment 920.

At some later time, the embedded system 910 may initiate key establishment 925. This may include sending a message with one or more random strings as well as a key ID associated with a key to be used for the session establishment. The remote control application may then perform key establishment operations, and may conclude with a key establishment response 930 to the embedded system 910. After key establishment is complete, remote control application 905 and embedded system 910 may each have a secure copy of one or more unique session keys to be used for a new session between the remote control application 905 and the embedded system 910.

After a session is established, remote control application 905 may receive a user input to control a device associated with the embedded system 910. Remote control application 905 may then send a notification of an even 930 to the embedded system. The embedded system 910 may send an acknowledgment 940 if it recognizes the remote control application has having a valid session, and at some later time sends an initiate event message 945 to remote control application 905. Responsive to receipt of the initiate event message, remote control application 905 sends an event response 950, which includes one or more commands to be executed by the embedded system. In one embodiment, remote control application 205 additionally notifies the WAN accessible service and/or other remote control applications of the command (and/or property updates associated with the command) responsive to sending the command to the embedded system. This may supplement or replace similar updates sent out by the embedded module when it updates a state of a device.

The embedded system 910 may execute the commands, which may cause a state of the device associated with the embedded system to change. Embedded system 910 may then send a status update of the device 955 to the remote control application 905, as well as to a WAN accessible service and to any other remote control applications with active sessions to the embedded system 910.

In the illustrated embodiment, embedded system 910 receives minimally sized notifications, and records receipt of the notifications in a queue. With this communication model, the embedded system may record just the identification of the remote control application (or WAN accessible service) that notifications have been received from, without storing any additional information. When embedded system 910 is ready to perform a next operation, embedded system 910 may send an initiate event message (or initiate key establishment message as appropriate) to a device that a notification was received from. Accordingly, data such as a nature of the event, data associated with the event, and so on may be stored at the remote control application 905 (or WAN accessible service), which typically will have far greater available resources than the embedded system 910. This maximizes efficient use of the embedded system's available resources.

In alternative embodiments, remote control applications may directly post messages (e.g., encrypted and signed packets) to the embedded system rather than waiting for a request of such messages.

Figure 10:
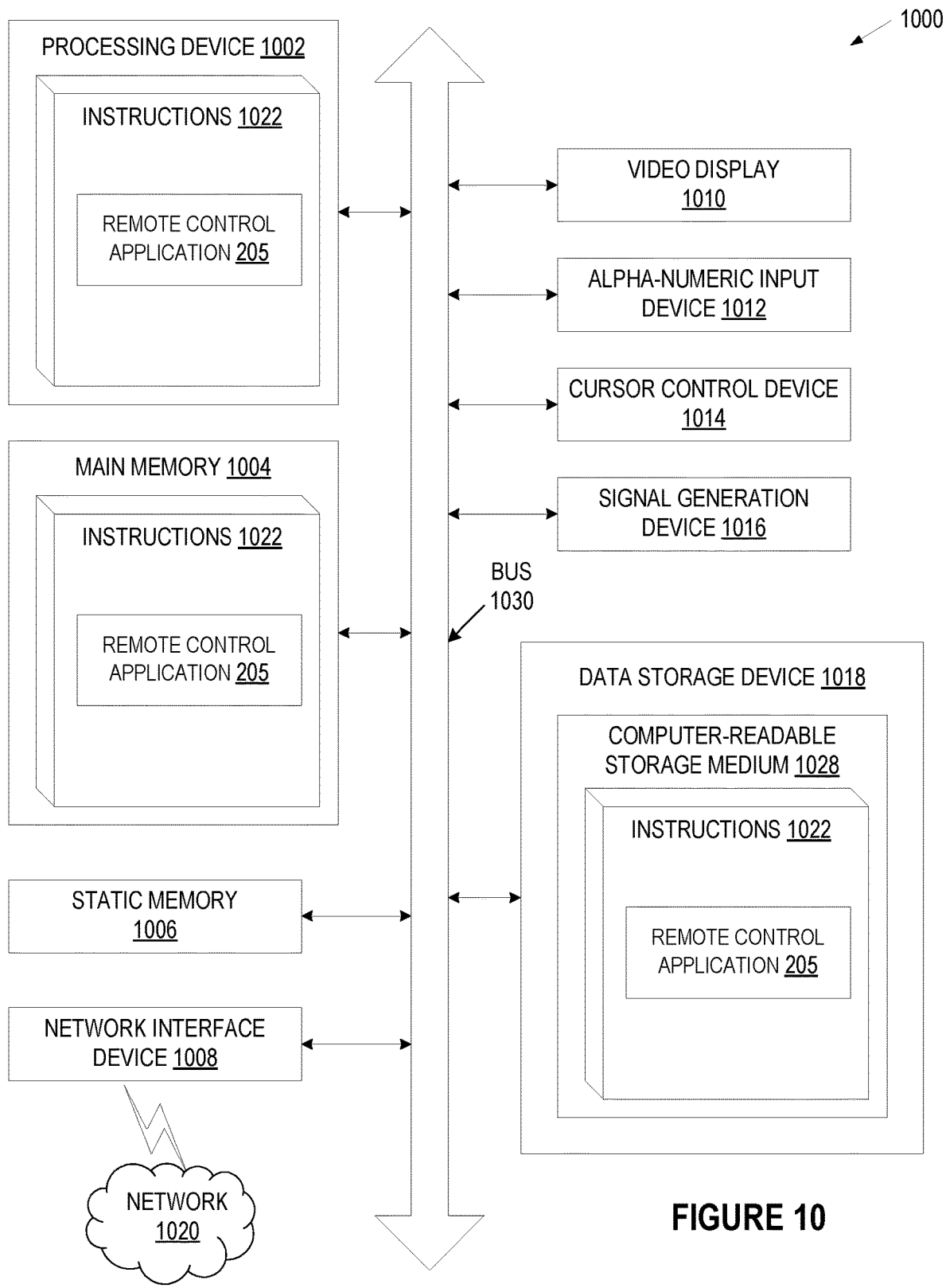
FIG. 10 illustrates a block diagram of one embodiment of a computing device.

FIG. 10 illustrates a diagrammatic representation of a machine in the example form of a computing device 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory (e.g., a data storage device 1018), which communicate with each other via a bus 1030.

Processing device 1002 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute the processing logic (instructions 1022) for performing the operations and steps discussed herein.

The computing device 1000 may further include a network interface device 1008. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium (or more specifically a computer-readable storage medium) 1028 on which is stored one or more sets of instructions 1022 embodying any one or more of the methodologies or functions described herein. The instructions 1022 may also reside, completely or at least partially, within the main memory 1004 and/or within the processing device 1002 during execution thereof by the computer system 1000, the main memory 1004 and the processing device 1002 also constituting computer-readable storage media.

The computer-readable storage medium 1028 may also be used to store a remote control application (as described with reference to FIG. 2), and/or a software library containing methods that call a remote control application. While the computer-readable storage medium 1028 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "connecting", "determining", "establishing", "communicating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A device comprising:
    a network adapter;
    a memory to store a shared key and a key identifier (ID) associated with the shared key; and
    a processing device operatively coupled to the network adapter and to the memory, wherein the processing device is to:
    connect to a local area network (LAN) using the network adapter;
    receive a first notification from a computing device that is also connected to the LAN;
    determine whether the computing device has access to a copy of the shared key based on the key identifier (ID);
    responsive to determining that the computing device has access to the copy of the shared key, use the shared key to generate a session key for a session with the computing device;
    encrypt communications to the computing device using the session key;
    determine that the shared key has been revoked by a wide area network (WAN) accessible service, wherein the WAN accessible service is a cloud-based service that is outside a range of the LAN;
    receive a new shared key and a new associated key ID from the WAN accessible service, wherein the new shared key and the new key ID are also sent to the computing device by the WAN accessible service; and use the new shared key to establish a new session key for a new session with the computing device.

2. The device of claim 1, wherein the processing device is further to:

receive a message for an embedded system of the device from the computing device, wherein the message comprises a command to update a state of the embedded system; and forward the command to an additional processing device of the embedded system for processing.

3. The device of claim 2, wherein the processing device is further to:

maintain a second session with the WAN accessible service; and responsive to the processing device changing a state based on the command, report the changed state to the WAN accessible service via the second session.

4. The device of claim 2, wherein the processing device is further to:

responsive to the processing device changing a state based on the command, report the changed state to the computing device via the session.

5. The device of claim 1, wherein the processing device is further configured to:

maintain a second session with the WAN accessible service;

detect that a connection to the WAN is unavailable;

record one or more state changes made by an embedded system of the device while the WAN is unavailable; and responsive to the connection to the WAN being restored, send an update to the WAN accessible service identifying the one or more state changes.

6. The device of claim 1, wherein the device comprises:

a communication module for an embedded system, the communication module comprising the network adapter, the memory and the processing device.

7. The device of claim 6, further comprising:

the embedded system, comprising:

a second processing device that is to perform one or more operations to control the device, wherein the second processing device is operatively coupled to the communication module; and a second memory operatively coupled to the second processing device, wherein the second memory comprises instructions for an application programming interface (API) for communicating with the communication module.

8. A method comprising:

storing, by a hardware module of an embedded system, a shared key and a key identifier (ID) associated with the shared key;

connecting to a local area network (LAN) by the hardware module;

receiving, by the hardware module, a first notification from a computing device that is also connected to the LAN;

determining whether the computing device has access to a copy of the shared key based on the key ID;

responsive to determining that the computing device has access to the copy of the shared key, using the shared key to generate a session key for a session with the computing device;

encrypting communications to the computing device using the session key;

determining that the shared key has been revoked by a wide area network (WAN) accessible service, wherein the WAN accessible service is a cloud-based service that is outside a range of the LAN;

receiving a new shared key and a new associated key ID from the WAN accessible service, wherein the new shared key and the new key ID are also sent to the computing device by the WAN accessible service; and using the new shared key to establish a new session key for a new session with the computing device.

9. The method of claim 8, further comprising:

receiving a message from the computing device, wherein the message comprises a command to update a state of the embedded system; and forwarding the command to a processing device of the embedded system for processing.

10. The method of claim 9, further comprising:

maintaining a second session with the WAN accessible service; and responsive to the processing device changing a state based on the command, reporting the changed state to the WAN accessible service via the second session.

11. The method of claim 9, further comprising:

responsive to the processing device changing a state based on the command, reporting the changed state to the computing device via the session.

12. The method of claim 9, further comprising:

receiving a second notification from the computing device, the second notification indicating that the computing device has the message for the embedded system;

adding the second notification to a queue; and sending a request for the message to the computing device when the second notification reaches a beginning of the queue.

13. The method of claim 8, further comprising:

maintaining a second session with the WAN accessible service;

detecting that a connection to the WAN is unavailable;

recording one or more state changes made by the embedded system while the WAN is unavailable; and responsive to the connection to the WAN being restored, sending an update to the WAN accessible service identifying the one or more state changes.

14. A computing device comprising:

a memory; and a processing device operatively coupled to the memory, the processing device to:

generate a first shared key for an embedded system, wherein the embedded system is a component of a device;

generate a first key identifier (ID) for the first shared key;

establish a first secure session with the embedded system;

send the first shared key and the first key ID to the embedded system;

establish a second secure session with a remote control application running on a mobile computing device, wherein the remote control application is registered to the embedded system in a user account;

determine whether the embedded system has received the first shared key and the first key ID;

responsive to determining that the embedded system has received the first shared key and the first key ID, send the first shared key and the first key ID to the remote control application, wherein the remote control application is to use the first shared key to establish a third secure session between the remote control application and the embedded system;

revoke the first shared key;

notify at least one of the remote control application or the embedded system that the first shared key has been revoked;

generate a second shared key for the embedded system;

generate a second key ID for the second shared key;

send the second shared key and the second key ID to the embedded system; and send the second shared key and the second key ID to the remote control application, wherein the remote control application is to use the second shared key to establish the third secure session between the remote control application and the embedded system.

15. The computing device of claim 14, wherein the processing device is further to:

determine that the first shared key has been compromised or that the first shared key has expired prior to revoking the first shared key.

* * * * *